Figure 1:
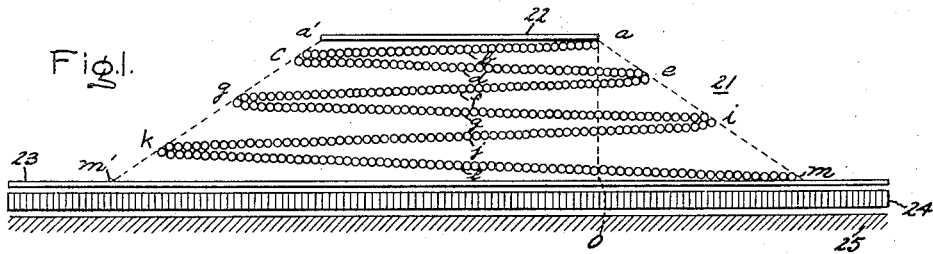

Aug. 7, 1945.	H. O. STEPHENS	2,381,782
ELECTRICAL APPARATUS
Filed Nov. 26, 1943	6 Sheets-Sheet 1

Inventor
Howard O. Stephens,
by Harry E. Dunham
His Attorney

Inventor:
Howard O. Stephens,
by Harry E. Dunham
His Attorney.

Inventor:
Howard O. Stephens,
by Harry E. Dunham
His Attorney.

Aug. 7, 1945.                H. O. STEPHENS                2,381,782
                           ELECTRICAL APPARATUS
                         Filed Nov. 26, 1943            6 Sheets-Sheet 4

Inventor:
Howard O. Stephens,
by Harry E. Dunham
    His Attorney.

Aug. 7, 1945.    H. O. STEPHENS    2,381,782
ELECTRICAL APPARATUS
Filed Nov. 26, 1943    6 Sheets-Sheet 5

Inventor:
Howard O. Stephens,
by Harry E. Dunham
His Attorney.

Aug. 7, 1945.  H. O. STEPHENS  2,381,782
ELECTRICAL APPARATUS
Filed Nov. 26, 1943   6 Sheets-Sheet 6
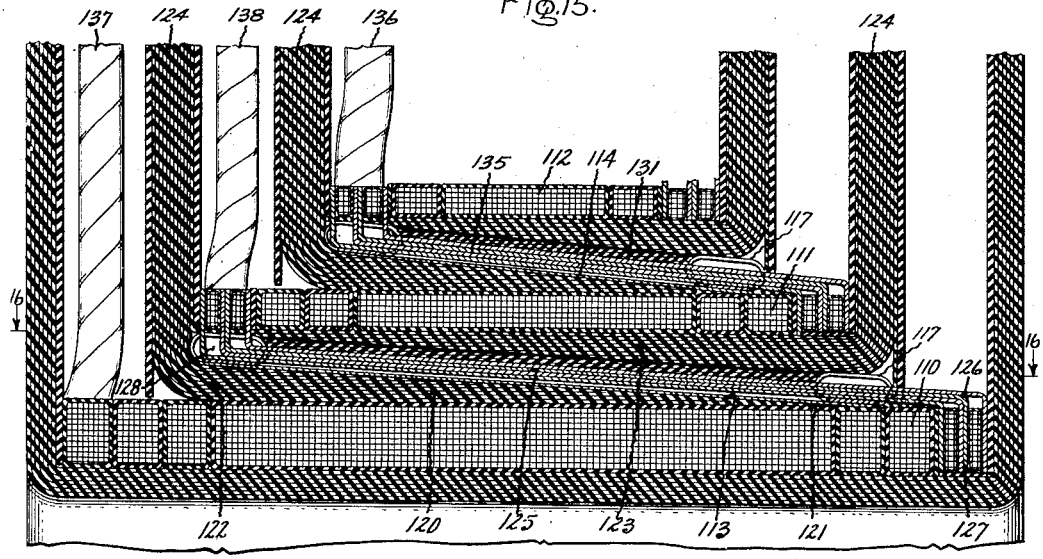
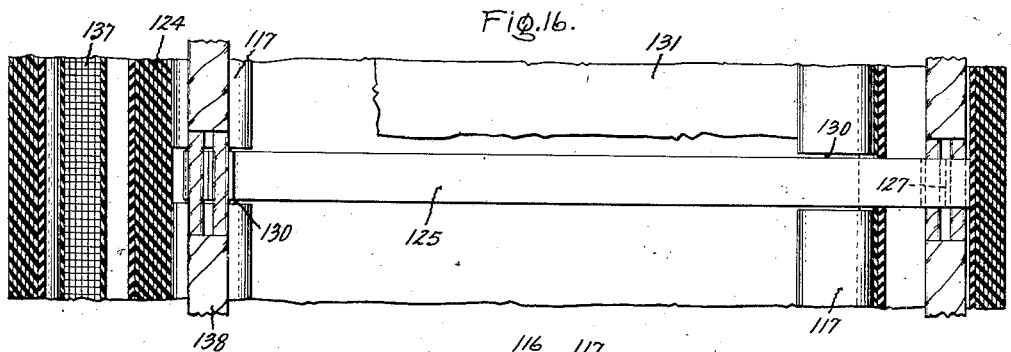
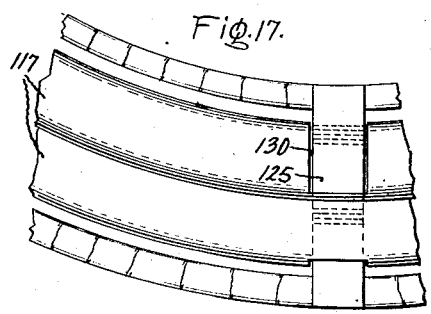
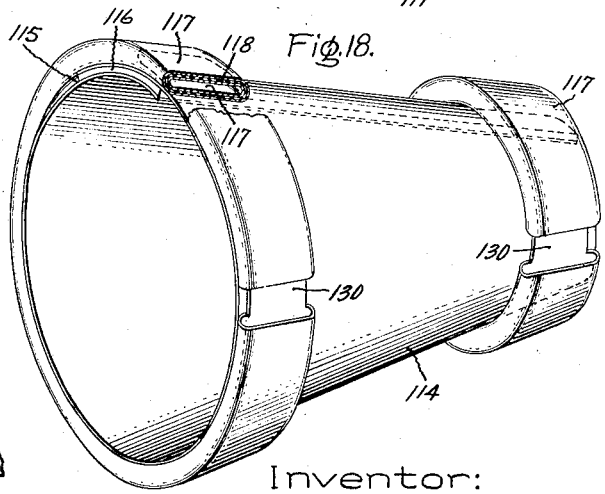
Inventor:
Howard O. Stephens,
by Harry E. Dunham
His Attorney.

Patented Aug. 7, 1945

2,381,782

UNITED STATES PATENT OFFICE 2,381,782

ELECTRICAL APPARATUS

Howard O. Stephens, Pittsfield, Mass., assignor to General Electric Company, a corporation of New York Application November 26, 1943, Serial No. 511,854

13 Claims. (Cl. 175—356)

This application is a continuation-in-part of my application Serial No. 417,510, filed November 1, 1941.

This invention relates to high-tension electrical apparatus, and has for an object the improvement of the voltage stress distribution in the windings of such apparatus under electrical disturbances such as lightning and switching surges.

It is well recognized in the art that the transient potential distribution of a high-tension winding such as that of a transformer may be rendered seriously non-linear due to those small capacitances of the windings to ground which are too small to affect materially the normal or steady-state potential distribution of the winding. A general rational solution of this has been given in U. S. Patent No. 1,585,448 issued to J. M. Weed which is assigned to the assignee of the present invention. It includes the arrangement of the elements, such as the turns, layers of coils, of the high-tension winding between the two plates of a two-plate condenser, each terminal of the winding being connected to the adjacent condenser plate, in such a manner that the potential distribution in the winding corresponding to the normal electrostatic field of the condenser will coincide with the potential distribution corresponding to the normal alternating magnetic field of the winding. In practice, this is carried out by arranging the $n$ elements of the winding between the two condenser plates so as to make the distance of the $j$th winding element from the condenser plate adjacent the first element equal to $j/n$ times the total distance between the two plates. In those instances in which the condenser plates are at least coextensive with the widest portion of the winding element, and the distance between the plates is less than the dimensions of the plates themselves, then, if there is not excessive exposure to ground potential at the open sides of the winding, reasonably good potential distributions may be obtained in practice. However, I have discovered that if the winding elements, for instance the layers of a layer-wound winding, are tapered in length, that is the layers having different lengths, then, even though each condenser plate may cover its adjacent winding layer, and the distance between the plates may be smaller than the dimensions of the smaller plate, and direct exposure to ground from the sides of the winding may be negligible, and the general level of the potentials of the various layers may conform to a substantially straight line, still, seriously high potential gradients may exist at the ends of the winding layers due to spurs—or, in mathematical language, "cusps"—in the impulse potential distribution curve of the winding at those points, as will be explained below more in detail.

A primary object of the invention is therefore the smoothing of these cusps so as to relieve the high gradients and insulation stresses resulting therefrom.

Other objects and benefits of the invention will be evident as the description of the invention progresses.

Figure 2:
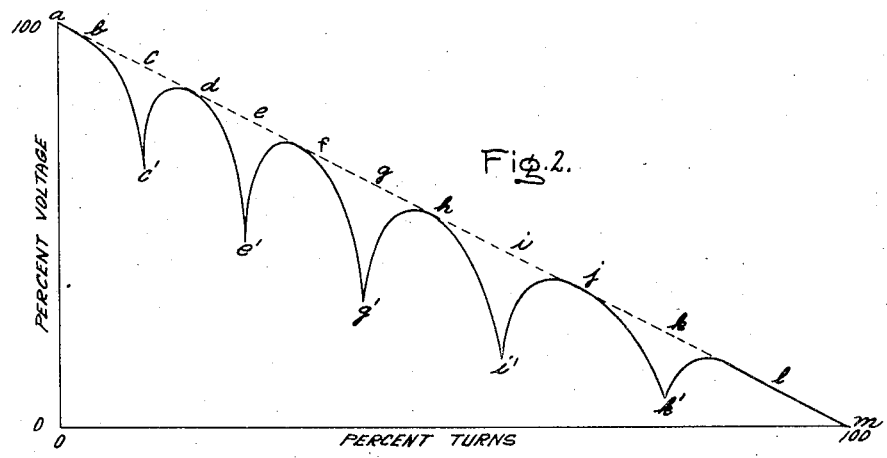
Figure 3:
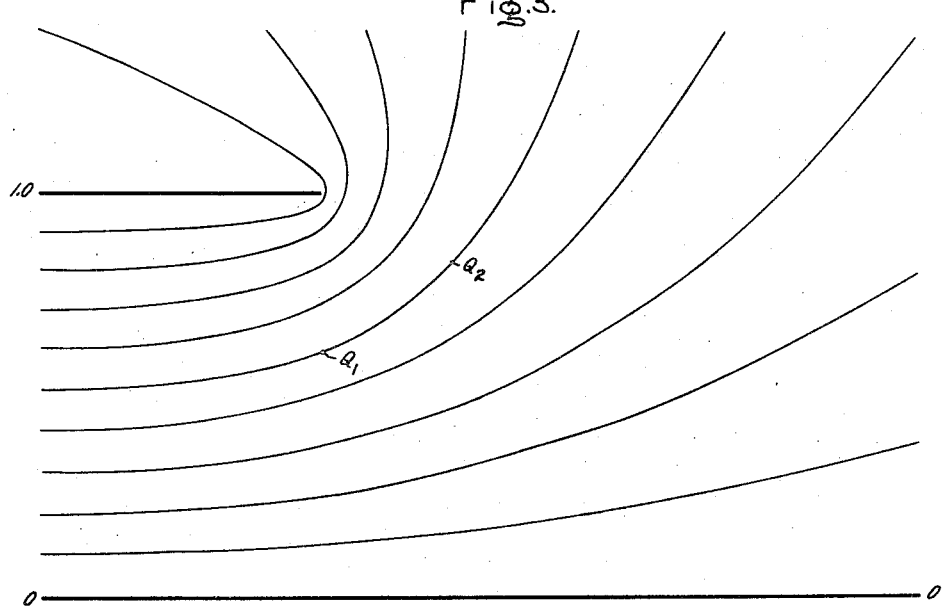
Figure 4:
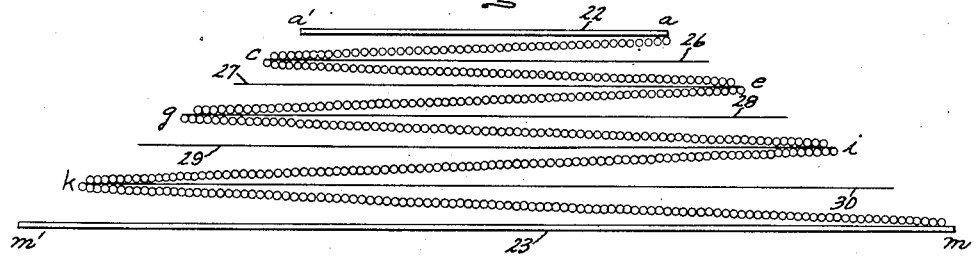
Figure 5:
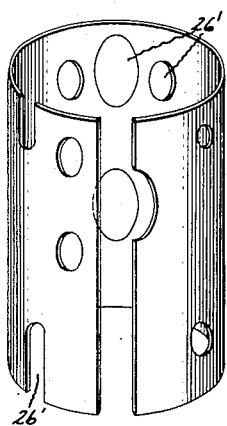
Figure 6:
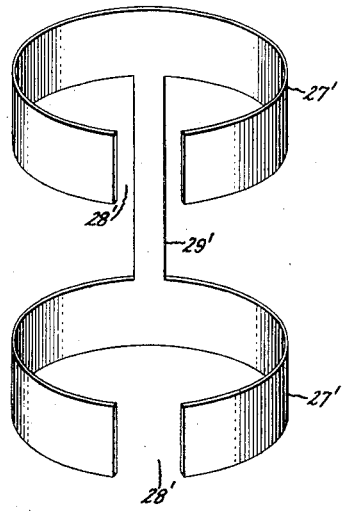
Figure 7:
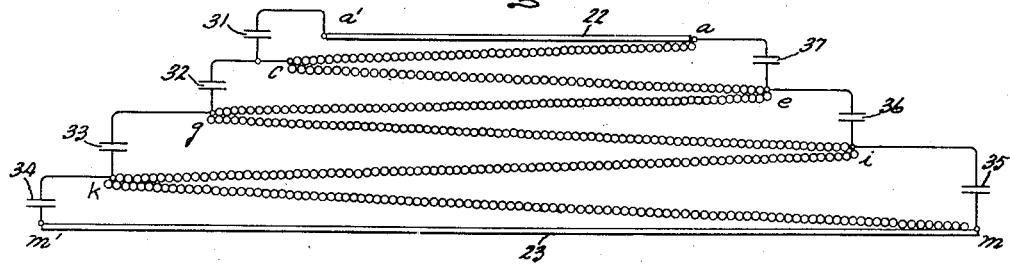
Figure 8:
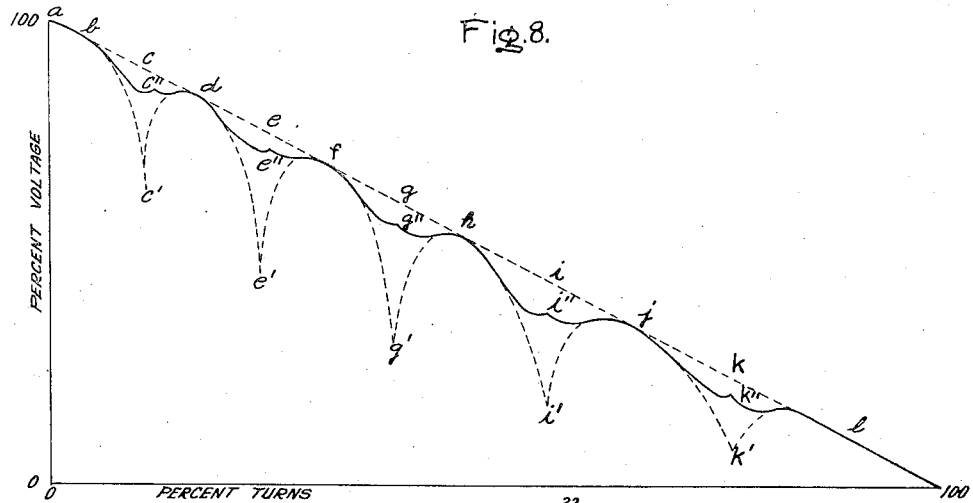
Figure 9:
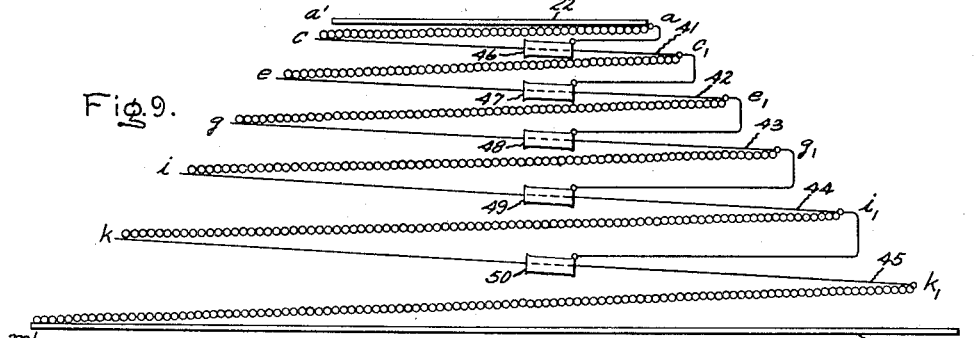
Figure 10:
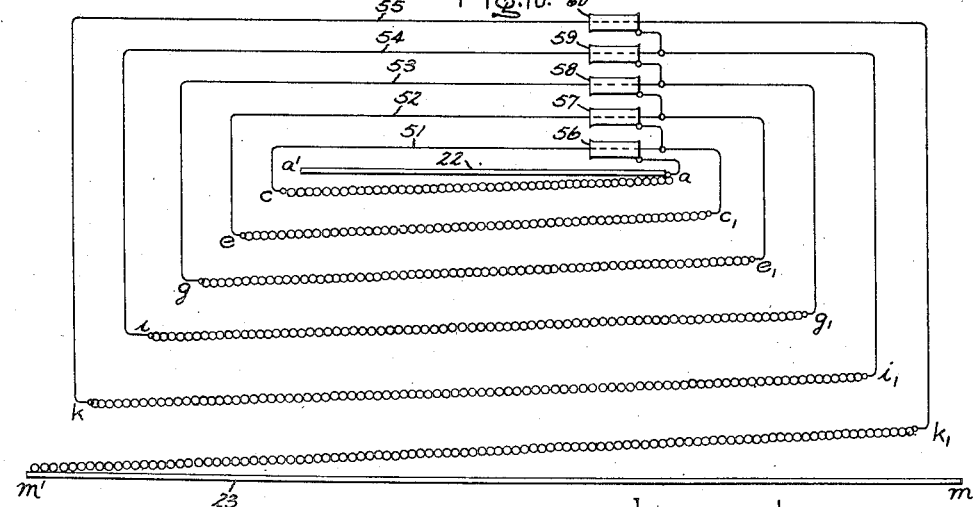
Figure 11:
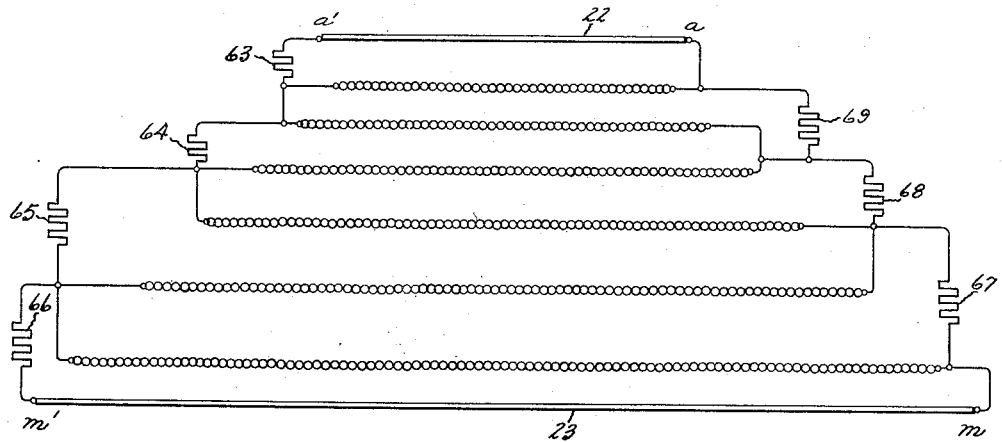
Figure 12:
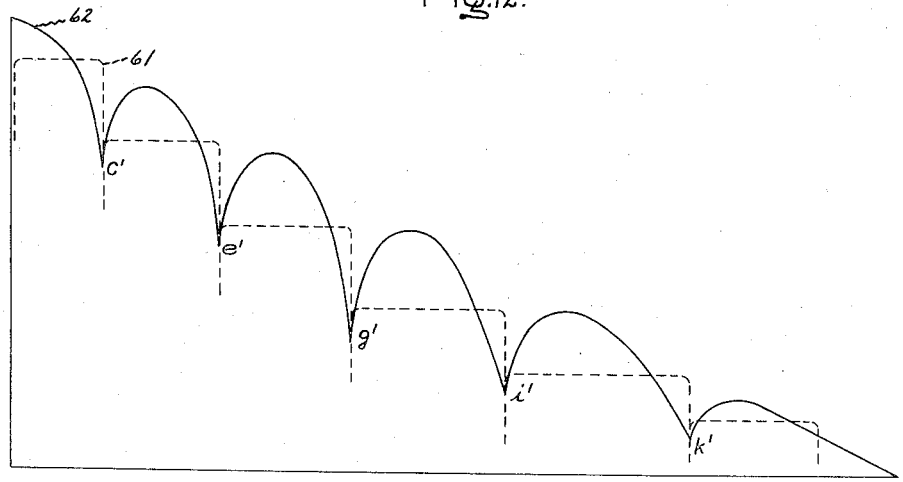
Figure 13:
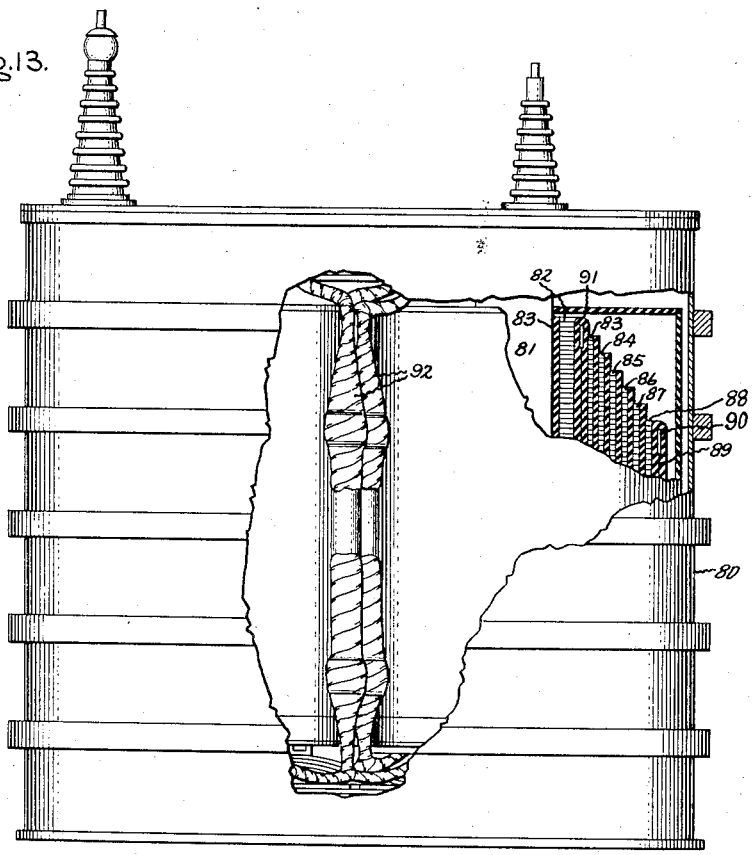
Figure 14:
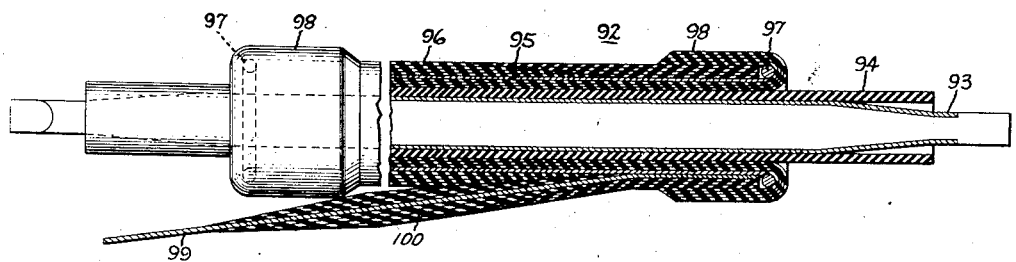

In the accompanying drawings Fig. 1 illustrates semi-diagrammatically the cross-section of a portion of a layer-wound winding and cooperating core, with tapered length of layers and with electrostatic shield plates at the two ends of the winding, a type of winding construction to which the present invention may be applied with particualr benefit; Fig. 2 illustrates the transient potential distribution curve of the winding of Fig. 1 when subjected to a steep electrical impulse, and illustrates the "cusps" mentioned above; Fig. 3 illustrates the equipotential lines of the potential field of one end of the electrostatic plates of Fig. 1 when the winding is subjected to a steep electrical impulse, with the help of which diagram Fig. 2 has been computed; Fig. 4 semi-diagrammatically illustrates a portion of a layer-wound winding which is provided with an embodiment of the present invention and includes a plurality of conductive plates embedded in the high-tension winding for smoothing out the cusps from its potential distribution; Figs. 5 and 6 illustrate types of embedded plates which may be employed in windings as illustrated in Fig. 4; Fig. 7 illustrates a method for correcting potential spurs by means of condensers, alternative to the embedded plates of Fig. 4; Fig. 8 illustrates the general nature of the improvement effected by the structure of Fig. 7; Fig. 9 illustrates one form of the application of the invention to another arrangement of winding; Fig. 10 illustrates another adaptation of the invention to the winding of Fig. 9; Fig. 11 illustrates a modification of the winding of Fig. 9; Fig. 12 illustrates the potential distribution of the winding of Fig. 9 under the different conditions without corrective means for said cusps; Fig. 13 illustrates a side view of a transformer in partial section provided with an embodiment of the present invention; Fig. 14 is a sectional side elevation of one of the external cross-overs employed in the transformer of Fig. 13; Fig. 15 is a sectional side elevation of a portion of a transformer which is provided with a further modification of my invention; Fig. 16 is a plan view taken along the lines 16—16 of Fig. 15; Fig. 17 is a fragmentary end view of one of the shields and internal cross-over between two adjacent windings; and Fig. 18 is a perspective view partially in section of one of the shields employed in the transformer of Figs. 15 to 17.

Referring now to Fig. 1 of the drawings, 21 represents the axial or longitudinal cross-section of a tapered six-layer solenoidal winding, comprising the layers $a$—$c$, $c$—$e$, $e$—$g$, $g$—$i$, $i$—$k$, and $k$—$m$, with $a$—$c$ as the outermost layer and $k$—$m$ the innermost layer. It is to be understood that the distances between the layers are accentuated over that which they would be in an actual winding so as to clearly show the several layers. These are arranged between two cylindrical electrostatic shield plates—a line shield 22 and a ground shield 23—and adjacent and conductively connected to them at the respective ends of the windings, $a$ and $m$. Both shield plates have longitudinal discontinuities in them to prevent them from short-circuiting the normal voltage of the winding. The layers of the winding are shown sloping, with alternately positive and negative slopes, at a constant angle with respect to the shield plates, and assuring thereby at least to the mid-section turns such as $b$, $d$, $f$, $h$, $j$, $l$, such electrostatic potentials in the electrostatic field of the condenser as would correspond to a substantially uniform potential distribution along the turns of the winding. Multi-concentric windings, as illustrated in Fig. 1, are tapered, that is having decreasing lengths, toward the layer with the highest voltage so that the distances between the ends of the layers and the adjacent core structure will be proportional to the voltages of the layers in order to minimize the possibility of flashover between the ends of the layers and the core and other structure at ground potential. Since the shield 22 is connected to line potential, it also has a length $a$—$a'$ which is about as long as the adjacent layer, and I have found that with $a'$—$a$ greatly reduced in length compared with $m'$—$m$, or compared with $k$—$m$, the impulse potential distributions in the neighborhood of the ends of the layers, namely at $c$, $e$, $g$, $i$ and $k$, deviate sharply from the generally uniform potential distribution, as shown in Fig. 2, in which it will be observed that while the potentials of the mid-section turns $d$, $f$, $h$, $j$, $l$ fall on the uniform distribution curve shown dotted in Fig. 2, the potentials of the end points have dropped drastically in sharp spurs or cusps, exhibiting the potentials $c'$ instead of $c$, $e'$ instead of $e$, $g'$ instead of $g$, etc. Obviously, the potential gradients, that is, the voltages per turn or per unit distance along the layers are very high in the neighborhoods of these points, and also the potentials to the line shield are greatly intensified at these points. For instance, by inspection it will be evident that the potential difference between $c'$ and the line shield is more than twice that between $c$ and the line shield, so that the insulation between the turn, the insulation between the first layer and the line shield, as well as the insulation between adjacent layers would be correspondingly increased in complexity and cost if the windings were to be insulated to withstand these potentials.

Fig. 2 is constructed with the aid of Fig. 3 which shows a family of equipotential lines in the field of the condenser of Fig. 1. Figs. 1 and 3, are drawn to different scales but approximately to the same proportions; $a'$—$a$ (Fig. 1) is twice the distance between the plates 22 and 23; and $m'$—$m$ is two and a half times $a'$—$a$. Referring again to Fig. 1 the low-tension winding is indicated at 24, and 25 is the core leg surrounded by the low-tension and the high-tension windings. The ground shield 23 may extend beyond $m$ and $m'$, and both the low-tension winding and the core may be considered as at ground potential like the ground shield, in comparison with the general potential level of the high-tension winding. Also the core 25 may extend considerably farther than 23 and 24 at both ends, or, even when 25 does not so extend, the yokes are brought closer to the winding and exert an electrostatic effect somewhat similar to an infinitely extended ground plane. Therefore the equipotential curves of Fig. 2 have been calculated on the assumption of a ground shield extended indefinitely at both ends. As the high-tension winding is below and to the left of the geometrical boundary line $a$—$m$, small inaccuracies in those regions of these equipotential curves some distance away from this line $a$—$m$ to the right and above it, do not materially affect the correctness of the regions of these curves below and to the left of $a$—$m$ for the purposes of the present invention and its exposition.

If Figs. 1 and 3 are drawn to the same scale and Fig. 3 is superimposed on Fig. 1, the potential of any turn of the winding can be read off either directly or by interpolation with the aid of the curves of Fig. 3, noting on which equipotential curve (actual or interpolated) the turn in question falls.

The equipotential curves in their turn are calculated as follows. Taking the point O on the ground shield directly opposite to the point $a$ (the end) of the line-shield as the origin of coordinates, and representing the distances from it parallel to the shields as the abscissae, positive to the right and negative to the left, and representing the distances perpendicular to the ground shield as the ordinates, and expressing both coordinates of a point as fractions or multiples of the distance between the two shields, then $p$, that is, the potential of any point $(x, y)$, expressed as a fraction of the potential of the line shield is given by the equation $$x = (1/\pi)(1 - \phi + C^{-\phi} \cos \pi p)$$
$$y = (1/\pi)(\pi p + C^{-\phi} \sin \pi p)$$

in which $\phi$ is a parameter whose variation traces the equipotential curve corresponding to the assumed constant value of $p$. For instance, for the curve of $p = 0.5$; $\phi = 1$ gives the points $Q_1$, ($x = 0$, $y = 0.61$); and $\phi = 0$ gives the point $Q_2$ ($x = 0.32$, $y = 0.82$).

It will be now understood that cusps originate from the fact that the equipotential lines curve rapidly in the neighborhood of the winding boundaries $a$—$m$ and $a'$—$m'$ (Fig. 1), and therefore, if the equipotential lines could be rendered straight and parallel to the shield plates in the winding space bounded by $a'$—$a$—$m$—$m'$, the potential distribution of the winding would be along a straight line throughout. I shall, therefore, describe below suitable means for accomplishing this desirable result.

Now, a conductive surface always acts as an equipotential surface, and therefore I introduce into the insulation space of the winding, conductive surfaces, such as metallic cylinders or flexible insulating sheets with metallized or conductive painted surfaces, at a plurality of points in the winding, as represented in section in Fig. 4 by 26, 27, 28, 29 and 30, respectively, at the levels of c, e, g, i and k, and parallel to the shield plates. These auxiliary conducting cylinders are coaxial, and each one has a lengthwise discontinuity, just as in the cases of 22 and 23 and illustrated in Figs. 5 and 6, so as to prevent them from short circuit the potential electromagnetically induced in the normal operation of the apparatus as a transformer. The cylinder 26 at the level of c may be connected to the winding turn at c, or left isolated from it; and a similar comment applies to each one of the other corrective cylinders. The wrapping of these corrective cylinders into the winding in such positions is made particularly convenient if the layers of the winding and their insulation are wound in any suitable manner, such as in accordance with the method disclosed by L. V. Foster in the copending application, Serial No. 379,533, now Patent 2,328,443, granted August 31, 1943, and assigned to the assignee of the present invention.

The corrective cylinders should preferably extend at least to the winding boundaries a—m and a'—m'.

If the corrective cylinders 26 to 30 have different areas due to the differences in their lengths and diameters, they will have in general different capacitances if equally spaced, and may thereby shift the potentials of the points b, d, f, h, j, l, from a straight line (see Fig. 2). In that case either the slope of the different layers of the winding may be changed so as to render the potential distribution linear under the effect of these plates on the electrostatic field; or, what is a simpler measure, the area of the larger-area cylinders may be reduced so as to equalize the capacitances of the adjacent pairs while keeping their apparent overall lengths such as to reach at least the boundaries a—m and a'—m' of the winding. Reduction in the area of a cylinder can be accomplished by increasing the width of longitudinal discontinuities or by cutting out from the middle portions of the cylinder in various ways and shapes, as illustrated in Figs. 5 and 6. Fig. 5 illustrates various arbitrary shapes and locations 26' for cutting out portions of a cylinder, while Fig. 6 illustrates more clearly the principle that preferably any cutting out should be from the middle portions of the cylinders, as it is the end portions of the cylinders which are primarily useful in straightening out the curvature of the equipotential surfaces so as to prevent the cusps. Thus, the shield in Fig. 6 takes the form of two ring shaped portions 27', having longitudinal discontinuities 28', and an axially extending strap portion 29' connecting the portions 27'.

In order to prevent corona formation at the edges of any of the conducting cylinders, it is desirable to finish off their edges with a high-resistance border such as high-resistance paint applied to an insulation layer in contact with the conducting cylinder, these borders extending a little beyond the conducting sheets.

While it is very convenient to apply the corrective cylinders at the levels indicated in Fig. 4, it is to be understood that they may be placed at any other suitable levels and almost if not quite as effectively, and also just as conveniently, if the aforementioned Foster scheme is used for winding the winding. Neither is it essential to maintain the same distance between adjacent pairs of cylinders, it being sufficient, for winding layers of uniform slope, to maintain the effective areas of the cylinders, as affecting their capacitances, alike; and their effective lengths at least coextensive with that of the winding at that level. The effective areas of the cylinders need not be alike, if the physical distributions of the winding turns are correspondingly modified, so as to secure a linear electrostatic potential distribution.

As the primary purpose of these conducting cylinders is to render the equipotential lines (or surfaces) straight axially, it follows that their number, locations and outlines are capable of wide variations without impairing their effectiveness in practically eliminating or greatly reducing the aforementioned cusps from the potential distribution of the winding. Furthermore, as the cusps are much less severe near the ground end of the winding than the line end, it is practicable sometimes to apply these corrective measures near the line end of the winding only.

In another embodiment of the invention, the cusps are practically eliminated and the equipotential surfaces of the condenser field are substantially straightened out by means of appropriate condensers electrically connected between the terminal shields and the various turns of the winding at or near where the potential cusps occur, as illustrated in Fig. 7 by condensers 31 to 37 inclusive.

While condensers have been applied to a plurality of portions of a high-tension winding in prior art, they have been for the purpose of adjusting the general potential levels of the winding elements when these general levels have departed seriously from a straight line distribution of potential so that they will not accomplish the result I desire. However, I have discovered that the winding arrangement may be ideal in that the general potential levels of the winding elements correspond to a straight line potential distribution, but there still may be cusps at the ends of the winding layers. Thus I do not employ condensers to modify the potentials of the layers as a whole, but to change their direction in the immediate neighborhood of the points to which the condensers are connected so as to prevent the equipotential lines from crossing the ends of the windings. Thus their capacitances will be very small as compared with what would be necessary if the potential levels of layers were being modified.

The potential distribution of a winding of the type of Fig. 1 equipped with corrective condensers of the proper value, as illustrated in Fig. 7, is shown by the full line curved in Fig. 8. It will be seen in this figure that the potential of the turn c of Fig. 1 is raised from c' (Fig. 8) to c'', e' to e'', etc., all closer to the straight line distribution curve. These points can be raised higher or lower, as desired by varying the value of the capacitors 31 to 37, as will be explained below.

It may be further seen in Fig. 8 that, mathematically considered, cusps are not entirely removed by this method. However, it is also seen that their magnitudes and gradients can be reduced sufficiently to make the resulting potential distribution curve acceptable as linear for all practical purposes. This may be the better appreciated if it is pointed out that the cusps at c''. e'', etc., have only a mathematical existence, in the sense that they could be realized only under impulses having almost rectangular fronts and that they would be found almost completely smoothed out in practice under the steepest impulse potential tests now required to be applied to high-tension transformers by the American Institute of Electrical Engineers or the American Standards Association.

While in view of the complicated mathematical shape of the theoretical potential distribution in Fig. 8, it is impractical to develop a precise mathematical formula for the determination of the corrective condensers of Fig. 7, yet I find that approximate values of their capacitances entirely satisfactory for commercial transformer manufacture, can be determined very conveniently by trial, with the help of a so-called calculating board, various forms of which are in extensive use in the electrical industry for setting up and solving the characteristics of electrical networks. The electrostatic network of the winding in question would be set up on such a board in terms of resistance elements, as well understood in the art, the potentials at the desired points determined, corrective impedance elements introduced and modified by trial so as to practically eliminate the cusps without materially altering the general potential levels of the winding elements.

Fig. 9 illustrates the invention as applied to another type of winding arrangement and by means of a different corrective structure. In this winding, the starting turn of one layer, say $c$, and the finishing turn of the preceding layer, $c_1$, are not adjacent but at opposite ends of the winding and are connected to each other by means of a cross-over conductor 41, similar to the other pairs of adjacent layers with the cross-over conductors 42, 43, 44 and 45. The potential distribution of such a winding is similar to that of Fig. 1, with marked cusps. Corrective condensers could have been introduced here in the same manner as in Fig. 7, but an equivalent alternative corrective capacitive means is illustrated in Fig. 9 as conductive sheaths 46 to 50 inclusive, respectively surrounding the cross-over leads 41 to 45 inclusive and insulated therefrom, and respectively connected to the winding turns $a$, $c_1$, $e_1$, $g_1$, $i_1$, and $k_1$ normally at higher potentials than the corresponding cross-over leads. Sheath 46 being normally at a higher potential than conductor 41, raises the potential of the latter and hence the potentials of the winding turns $c$ and $c_1$, by electrostatic induction. Similar comments apply to the other sheaths.

In those windings in which the taper of the layers is moderate in comparison with the length $a'$—$a$ of the line shield, a simple tubular sheath such as 46 to 50 covering most of the lengths of the simple round cross-over conductors 41 to 45 may exercise sufficient corrective effect; but where these capacitances are found insufficient, they can be increased by using wide straps for these cross-over conductors 41 to 45, or a plurality of straps and sheaths may be used to secure the desired result.

If the layer-to-layer connections, instead of being made by cross-over leads located between the connected layers, are made outside of the winding, by outside cross-over leads 51 to 55 as illustrated in Fig. 10, the corrective condensers of Fig. 7 or the sheaths of Fig. 9, may be applied to these outside conductors, sheaths 56 to 60 being shown in Fig. 10.

In applying capacitive sheaths or other capacitive means to external cross-overs, it is not sufficient merely to shield or compensate them against their ground capacitances so as to secure the desired potentials on said cross-overs disconnected from their respective windings, for then they would not be able to remove the potential cusps from the winding layers to which they are connected. The capacitances associated with the cross-overs must be sufficiently large to effect substantial reductions in those cusps, though not too large to modify the average potentials of the layers.

In the adaptation of the invention shown in Fig. 11, the winding layers are all parallel, the finishing turn of the first (bottom) layer being connected to the starting turn of the second layer, the starting turn of the second layer being at the same end of the winding as the finishing turn of the first layer; the finishing turn of the second layer being connected to the starting turn of the third layer, the starting turn of the third layer being at the same end of the winding as the finishing turn of the second layer, etc. The line and the ground shields are also shown parallel to the winding layers. While this arrangement of the winding layers and shields deviates considerably from the ideal from the standpoint of potential distribution, it is used to a considerable extent because of the great convenience it affords in permitting winding layer after layer continuously back and forth without breaking the conductor, making each layer a solenoid of constant diameter, and the line and ground shields easy to shape as cylinders, without the use of tapered insulation between the shields and the adjacent conductive layers. The potential distribution of such a winding for a steep impulse wave, with all the layers disconnected from each other, is shown in Fig. 12 by the dotted graph 61; and when the layers are connected together, by the solid graph 62. It will be seen that the potential distribution curve of this arrangement also is subject to objectionable cusps, even though the general curve might be considered otherwise acceptable for the lower-voltage transformers and other less important purposes and as requiring no particular means to alter the average potential level of the winding elements.

The potential cusps of this arrangement also can be corrected by capacitive means as explained in connection with Figs. 7, 9 and 10; but to illustrate other equivalent and alternative means also, high-resistance elements 63 to 69 are shown in Fig. 11. The optimum values of these resistance elements also may be determined by trial with the help of a calculating board. The resistances may be provided in any suitable manner.

Fig. 13 illustrates a transformer, shielded according to my invention, having a conventional tank structure 80, the transformer tank structure being partly broken away to illustrate a portion of one end of one of the winding legs. This transformer includes two such winding legs, but it is to be understood that any suitable number of winding legs may be provided. Each of the winding legs includes a core having a winding leg 81 around which is wound a low voltage winding 82 suitably insulated from the core by insulation 83. Surrounding the low voltage winding is the high voltage winding of the tapered layer, multiconcentric type, including a plurality of layers 83 to 88 inclusive, the winding layers 83 to 88 being tapered so that a progressively longer distance is provided between the ends of the layers and the surrounding core structure as the voltage of the layers increases. Layer 88 is connected to the line by a suitable lead, and a shield 89 is provided adjacent to the layer 88, the shield being also connected to line potential. The shield 89 may be of any suitable type, such as a conducting portion in the form of a cylinder with insulation 90 surrounding the conducting cylinder. A ground shield 91 may also be provided between the low voltage winding 82 and the adjacent layer 83 of the high voltage winding, there being suitable insulation between the ground shield and the layer 83 and the ground shield and the low voltage winding 82. In some installations, the ground shield 91 may be omitted, the low voltage winding 82 acting as a ground shield so far as the electrostatic distribution of voltage is concerned.

As has been described above, a transformer having a multiconcentric tapered layer winding of the type shown in Fig. 13 and with the conventional shielding will have cusps in the voltage distribution at the ends of the winding layers, when a high voltage surge strikes the transformer. I therefore provide suitable means for changing the direction of the equipotential lines near the end sections of the layers so that these lines will not substantially cross over the ends of the layers, the arrangement including a suitable amount of capacity connected to the ends of the winding layers through external cross-over 92. As is seen more clearly in Fig. 14, the external cross-over includes a conductor 93 for connection between any suitable layers and suitable insulation 94 surrounding the lead 93. In order therefore to provide the proper capacitance, a conducting sheath 95 surrounds the cross-over lead 93, the sheath 95 being insulated by a plurality of wrappings of tape of suitable insulating material, such as crepe paper 96. In order to prevent corona at the ends of the sheath 95, a rounded conductor 97 is provided and the insulating tape 96, being longer than the sheath 95 is bent over as shown in 98 to form suitable insulation around the ends of the sheath 95. In order to connect the sheath 95 to the ends of one of the adjacent layers, as is clearly illustrated in Figs. 9 and 10, a connector 99 is electrically connected to the sheath 95 so that it may be used to make the suitable connection. Insulation 100 is provided around the connector 99. The size of the sheath 95 in relation to the size of the lead 93 and the distance between the conductor 93 and the sheath 95 may be so proportioned as to produce the desired capacity so as to substantially prevent or minimize the cusps at the ends of the winding layers, as is clearly described above.

Fig. 15 illustrates another type of transformer construction which is shielded according to my invention, which construction includes a plurality of concentric layers 110, 111, and 112. It is to be uderstood that any suitable number of concentric layers may be provided, three being shown in Fig. 15, and the layers may take any suitable length and in Fig. 15 they are tapered or the layers have progressively decreasing axial lengths toward the layer adapted to have the highest voltage, or toward the outer layer 112. It is to be understood that the outermost layer will have surrounding it a line shield similar to the line shield 89 and suitable low voltage shield means, such as a low voltage winding, or a low voltage shield similar to 91 may be provided around the inner layer 110.

In order suitably to shield such a winding construction and also thereby prevent cusps which are susceptible of being developed in the ends of the layers, as has been brought out above, I provide shielding means including a layer shield means 113 which is adjacent the conductor layers 110 and 111, and a layer shield means 114 which is adjacent or between the conductive layers 111 and 112. The shield construction may be of any suitable type and, as will be seen in the perspective view of Fig. 18, includes a conducting member of any suitable material such as a thin metallic piece which has a suitable diameter for surrounding the immediately inner layer. The shield also has an axial discontinuity 115 so that it will not provide a short-circuited current similar to a winding. This is formed by providing insulation 116 between the overlapping ends. The shields also have hollow conducting ring shaped members 117 at the opposite ends so as to provide a smooth edge at the ends and thereby minimize corona at those points. To insure shielding all the way around, the ends of the rings are in telescoping relation with insulation 118 between the adjacent ends.

In order suitably to support the shields as well as provide desirable layer insulation between the adjacent layers, it will be noted that the insulation between the layers, for instance, 110 and 111 includes a tapered layer insulation indicated by the numeral 120. This tapered layer insulation may be applied in any suitable manner, such as according to the method as described in the above-mentioned Foster patent. After the layer 120 has been built up so that there is a minimum of insulation at the end 121 and a maximum of insulation at the end 122, the conducting shield 113 may be provided around the layer insulation 120. It will be noted that the shield 113, since it is of relatively thin material, will be flexible so that it may be wrapped around the layer insulation. It will also be seen that upon wrapping the shield it will be tapered, or, in other words, will have the same contour as the outer surface of the layer insulation 120. After the shield 113 and the members 117 have been applied, a second layer of insulation 123 may be applied which builds up oppositely from the layer insulation 120. It will be noted in the drawing that the layers of insulation which are made up of a plurality of sheets include portions 124 at one end. It will be understood that when applying the insulation by the method as described in the above-mentioned Foster patent, the ends 124 are merely integral extensions of the layers of paper which make up the layer insulation, and that after the insulation has been applied, they may be bent in any suitable manner such as by slitting the ends of the paper so that the portions 124 will provide right angularly extending portions.

In order to provide a cross-over conection between opposite ends of the adjacent conductor layers, that is, for instance, the layers 110 and 111, I provide an internal cross-over 125 which, as will be seen in Fig. 15, includes a suitable number of conductor strips superimposed one on the other and which make electrical connection at one end 126 with the end of the conducting layer 110 by the angularly extending portions 127. The opposite ends of the internal cross-over 125 are provided with angularly extending ends 128 which make connection with the end of the conducting layer 111 which is opposite the end 127. It will further be seen, particularly in Figs. 16 and 17, that the rings 117 are provided with openings or passageways 130 of a width suitable to accommodate the internal cross-overs 125. Thus the internal cross-over as well as the conducting shield is provided between the adjacent layers 110 and 111 in such a manner that the thickness of the layer insulation will be proportional to the normal voltage between the conductive layers along a radial plane. Furthermore, my improved construction provides a very convenient way of providing both the shield and the internal cross-over in the tapered layer insulation. Since the cross-over is contiguous with the outer surface of the shield, both will be at the same potential. The broad idea of providing a cross-over conductor between layers in tapered layer insulation so that the insulation between the internal cross-over and the adjacent layers is proportional to the normal voltage between the layers is described and claimed in patent application to Kierstead, Serial No. 502,907, filed September 18, 1943, and which is assigned to the same assignee as this present invention.

As will be seen in Figs. 15 and 16, the radial thickness of the internal cross-over 125 is greater than the relatively thin sheet 113. In order to fill up the space between the rings 117, except the small space which is taken up by the internal cross-over 125, I provide layer insulation 131 which includes a suitable number of layers of paper to make up the desired thickness.

It will be understood that the shield 114 and internal cross-over 135 serially connecting the layers 111 and 112 are similarly provided in the manner described above in connection with the shield 113 and internal cross-over 125. Also, with the construction as is illustrated in Figs. 15 through 18, which is designed for relatively high voltage, the adjacent layers are usually considerably longer in axial length in relation to the radial thickness as is shown in Fig. 15. However, for the sake of facilitating the explanation, the length of the conductive layers has been shown relatively short, thus accentuating the tapering. Also, with such a winding which is many times longer in axial length than the thickness thereof, the various layer shields have substantially the same axial length as the adjacent conductive layers so that they will prevent or substantially minimize any equipotential lines of force from crossing the ends of the various conductor layers.

In order that a relatively large variety of voltages may be obtained with the construction as is shown in Fig. 15, I provide suitable taps or conductor terminals which are connected to any suitable number of the layers in addition to the first and last conductor layer. Thus a line terminal lead 136 is provided which connects with one end of the outer conductor layer 112, and a low voltage lead 137 is provided which is connected to an end of the inner conductor layer 110. It will also be seen that a conductor terminal 138 is provided which is connected to one end of the conductor layer 111. When such a transformer is connected with the various conductor terminals to overhead lines, it will be understood that high voltage surges may thereby enter the transformer winding through any one of the terminals. Thus my improved electrostatic shielding arrangement which is provided between the adjacent conductor layers not only prevents the formation of cusps but also will distribute any high voltage surge which enters the transformer through one of the internal taps, for instance the tap 138. It is to be understood that with a larger number than three of high voltage conductor layers are provided, each of these layers may also be provided with a tap similar to the tap 138, and which layers may also have layer conducting shields similar to the ones described above. A type of transformer which usually employs a lead connected to one of the intermediate layers is an autotransformer which employs a line connection between the series of common windings, and an improved arrangement including a layer shield for shielding such an autotransformer is described and claimed in my copending application, Serial No. 511,853, now Patent No. 2,374,049, granted April 17, 1945, and filed concurrently herewith and which is assigned to the same assignee as the present invention.

In view of the foregoing, it will be seen that I have provided an improved arrangement for eliminating the cusps which I have found to be present in voltage distribution at the end of tapered layer windings, upon the application of high voltage surge to the winding. These improved arrangements include suitable electroresponsive means, and properly proportioned conductor sheets between tapered layers of capacitors and resistors in suitable amounts connected between the ends of the layers. Other suitable electroresponsive means which will substantially eliminate cusps, which I have discovered are present at the ends of tapered layer windings, may of course, be employed. It will further be seen that I have provided an improved shielding arrangement for not only preventing cusps but also for suitably distributing electrostatic surges and preventing high impulses from being impressed on the windings where various taps are provided to the conducting layers between the high and low voltage terminals of the winding.

While I have shown particular embodiments of my invention, it will be understood, of course, that I do not wish to be limited thereto, since many modifications may be made and I, therefore, contemplate by the appended claims to cover any such modifications as fall within the true spirit and scope of my invention.

What I claim as new and desire to secure by Letters Patent of the United States is:

1. In a transformer, a high voltage winding including a plurality of substantially concentric serially connected conductor layers progressively decreasing in axial length toward the layer having the highest voltage, a line shield surrounding said layer having the highest voltage and having axial length approximately equal to that of said adjacent layer, and a shield between adjacent layers and having a length substantially the same as that of the adjacent layers so as to substantially prevent the equipotential electrostatic lines under steep voltage impulses from crossing the ends of said adjacent layers.

2. In a transformer, a high voltage winding including a plurality of substantially concentric serially connected tapered layers, said layers being tapered toward the layer having the highest voltage, a line shield surrounding said layer having the highest voltage and having axial length approximately equal to that of said adjacent layer, and a shield between adjacent layers and having a length substantially the same as that of the adjacent layers so as to substantially prevent the equipotential electrostatic lines under steep voltage impulses from crossing the ends of said adjacent layers, said shield having a pair of axially spaced ring portions with axial discontinuities and a conducting strap between said ring portions.

3. In a transformer, a high voltage winding including a plurality of substantially concentric tapered layers, said layers being tapered toward the layer having the highest voltage, a line shield surrounding said layer having the highest voltage and having an axial length approximately equal to said adjacent layer, cross-over conductors for connecting said layers in series, and conducting sheaths surrounding said cross-overs so as to provide a value of capacity of sufficient value to substantially prevent the equipotential electrostatic lines under steep voltage impulses from crossing the ends of said layers.

4. In a transformer, a high votage winding including a plurality of substantially concentric tapered layers, said layers being tapered toward the layer having the highest voltage, a line shield surrounding said layer having the highest voltage and having an axial length approximately equal to said adjacent layer, cross-over conductors for connecting said layers in series, conducting sheaths surrounding said cross-overs so as to provide a value of capacity of sufficient value to substantially prevent the equipotential electrostatic lines under steep voltage impulses from crossing the ends of said layers, said sheaths having conducting means of smooth contour at the ends thereof for minimizing the possibility of corona, and insulating sheets between said sheaths ends and cross-over conductor, said sheets being folded over the ends of said sheaths.

5. In an electrical induction apparatus, a relatively high voltage winding including a plurality of concentric serially connected conductor layers progressively decreasing in axial length toward the layer adapted to have the highest voltage, a line shield surrounding said layer having the highest voltage and having an axial length approximately equal to that of said adjacent layer, means providing lower voltage shield means adjacent the inner of said layers so that said shield means have therebetween an electrostatic field with a plurality of equipotential electrostatic lines under steep voltage impulses, and means including conductive shield means between adjacent of said layers and having a length substantially the same as that of said adjacent layers so as to substantially prevent the equipotential electrostatic lines under steep voltage impulses from crossing the ends of said adjacent layers.

6. In an electrical induction apparatus, a relatively high voltage winding including a plurality of concentric conductor layers, said conductor layers having decreasing axial lengths toward the layer adapted to have the highest voltage, cross-over conductor means connecting one end of one of said conductor layers with the opposite end of the adjacent conductor layer, a line shield surrounding said layer having the highest voltage and having an axial length approximately equal to that of said adjacent layer, means providing lower voltage shield means adjacent the inner of said layers so that said shield means have therebetween an electrostatic field with a plurality of equipotential electrostatic lines under steep voltage impulses applied to said winding, and means including conductive shield means between adjacent of said layers and having a length substantially the same as that of said adjacent layers so as to substantially prevent the equipotential electrostatic lines under steep voltage impulses from crossing the ends of said adjacent layers, said internal cross-over conductor means lying between said adjacent conductor layers and adjacent said conductive shield means.

7. In an electrical induction apparatus, a relatively high voltage winding including a plurality of concentric conductor layers, said conductor layers having decreasing axial lengths toward the layer adapted to have the highest voltage, cross-over conductor means connecting one end of one of said conductor layers with the opposite end of the adjacent conductor layer, a line shield surrounding said layer having the highest voltage and having an axial length approximately equal to that of said adjacent layer, means providing lower voltage shield means adjacent the inner of said layers so that said shield means have therebetween an electrostatic field with a plurality of equipotential electrostatic lines under steep voltage impulses applied to said winding, and means including conductive shield means between adjacent of said layers and having a length substantially the same as that of said adjacent layers so as to substantially prevent the equipotential electrostatic lines under steep voltage impulses from crossing the ends of said adjacent layers, ring shaped members adjacent the ends of said layer shield so as to provide a smooth surface at the ends thereof, said internal crossover conductor means being between said adjacent conductor layers, said ring shaped members having axial passages through which said cross-over means extends.

8. An electrical induction apparatus including a plurality of concentric conductor layers, a conductor cross-over between adjacent of said conductor layers and connecting one end of one layer with the opposite end of an adjacent layer, tapered layer insulation between said adjacent conductor layers, means including layer conductive shield means between adjacent of said layers, said layer conductive shield means and said conductive cross-over being disposed within said tapered layer insulation so that said conductor cross-over and said conductive layer shield means will be radially disposed between said adjacent conductor layers proportional to the normal voltage between said adjacent conductor layers.

9. An electrical induction apparatus including a plurality of concentric conductor layers, a conductor cross-over between adjacent of said conductor layers and connecting one end of one layer with the opposite end of an adjacent layer, tapered layer insulation between said adjacent conductor layers, means including layer conductive shield means between adjacent of said layers, said layer conductive shield means and said conductor cross-over being disposed within said tapered layer insulation so that said conductor cross-over and said conductive layer shield means will be radially disposed between said adjacent conductor layers proportional to the normal voltage between said adjacent conductor layers, said conductor cross-over being contiguous with the surface of said conductive layer shield means.

10. An electrical induction apparatus including a plurality of concentric conductor layers, terminal leads connected to ends of said conductor layers so that voltage impulses may be impressed on said layers through said terminal leads, a conductor cross-over between adjacent of said conductor layers and connecting one end of one layer with the opposite end of an adjacent layer, tapered layer insulation between said adjacent conductor layers, means including layer conductive shield means between adjacent of said layers, said layer conductive shield means and said conductor cross-over being disposed within said tapered layer insulation so that said conductor cross-over and said conductive layer shield means will be radially disposed between said adjacent conductor layers proportional to the normal voltage between said adjacent conductor layers.

11. In an electrical induction apparatus, a relatively high voltage winding including a plurality of serially connected concentric conductor layers, said conductor layers having decreasing axial lengths toward the outer of said layers, a line shield surrounding said outer layer and having a length approximately equal to that of said outer layer, means providing lower voltage shield means adjacent the inner of said layers so that said shield means have therebetween an electrostatic field with a plurality of equipotential electrostatic lines under steep voltage impulses, a terminal lead connected to an end of one of said concentric layers between the inner and outer layer so that voltage impulses may be impressed on said layer through said terminal leads, and layer shield means between said layer having connection with said terminal and an adjacent of said layers so as to distribute any suddenly impressed impulses and to substantially prevent equipotential electrostatic lines under steep voltage impulses from crossing the ends of said adjacent layers.

12. In a high-tension electrical apparatus, a winding having a plurality of substantially concentric serially connected conductor layers progressively decreasing in axial length toward the layer adapted to have the highest voltage, a line shield surrounding said layer having the highest voltage and having an axial length approximately equal to that of said layer, means providing a lower voltage shield adjacent said longest layer and having an axial length approximately equal to that of said longest layer, and means including electroresponsive means associated with said winding, so as to substantially prevent equipotential electrostatic lines under steep voltage impulses from crossing the ends of said conductor layers, said electroresponsive means comprising impedance means connected at least to the ends of some of the conductor layers between said layers adjacent said line and lower voltage shield means and to another point of said winding normally at a higher potential than said conductor layer ends.

13. In a high tension alternating current apparatus, a winding having a plurality of substantially concentric serially connected conductor layers progressively decreasing in axial length toward the layer adapted to have the highest voltage, a line shield surrounding said conductor layer adapted to have the highest voltage and having an axial length approximately equal to that of said layer, means providing a lower voltage shield means adjacent the longest of said conductor layers and having an axial length approximately equal to said longest conductor layer, and electrostatic shield means including electroresponsive means electrically associated with said conductor layers between said line shield and lower voltage shield means so as to substantially prevent the equipotential electrostatic lines under steep voltage impulses from crossing the ends of said conductor layers.

HOWARD O. STEPHENS.